United States Patent [19]

Strasser

[11] 3,946,589
[45] Mar. 30, 1976

[54] THERMOSTATIC DISC SEAT FORMING CALIBRATION PROCESS AND APPARATUS

[75] Inventor: Werner Strasser, Salvisa, Ky.

[73] Assignee: Texas Instruments Incorporated, Dallas, Tex.

[22] Filed: Dec. 10, 1973

[21] Appl. No.: 423,357

[52] U.S. Cl. .................................................. 73/1 F
[51] Int. Cl.² ........................................ G01K 15/00
[58] Field of Search ...................................... 73/1 F

[56] References Cited
UNITED STATES PATENTS

| | | | |
|---|---|---|---|
| 2,714,759 | 8/1955 | Wangenheim | 73/1 F |
| 3,636,622 | 1/1972 | Schmitt | 73/1 F |
| 3,683,654 | 8/1972 | Hire | 73/1 F |

Primary Examiner—James J. Gill
Assistant Examiner—Anthony V. Ciarlante
Attorney, Agent, or Firm—John A. Haug; James P. McAndrews; Russell E. Baumann

[57] ABSTRACT

The disclosure relates to a method and apparatus for on-line calibration of disc thermostats. A disc thermostat is initially provided in assembled condition, the gap at the switch measured and compared with a predetermined optimum gap, the error magnitude determined and a device operated to alter the position of the disc and transfer element relative to the switch to provide the predetermined optimum gap. A feedback generator station tests a prior thermostat during disc snapping for disc velocity and switch opening and provides a fine tuning adjustment signal to alter the predetermined optimum gap on-line.

12 Claims, 3 Drawing Figures

VIRT. ZERO FORCE LINEAR TRANSDUCER 33
CALIBRATION STATION

FEED-BACK GENERATING
CHECK STATION

THERMOSTATIC DISC SEAT FORMING CALIBRATION PROCESS AND APPARATUS

This invention relates to a method of on-line calibration of assembled disc-type thermostats and, more specifically to a method of on-line determination of switch gap, adjustment to a predetermined optimum gap and on-line altering of the predetermined optimum gap by testing prior calibrated thermostats.

Disc-type thermostats are composed of several parts, the dimensions and positioning of each being critical to obtaining optimum thermostat performance and life expectancy. In prior art disc-type thermostats optimum performance was obtained by careful measurement of the thermostat parts, this being costly. Prior art methods of making disc-type thermostats also relied heavily upon measurements obtained through trial and error procedures and upon statistical methods. None of the prior art methods have been satisfactory, requiring that quality disc-type thermostats be relatively expensive.

In accordance with the present invention, there is provided a method of on-line calibration of assembled disc-type thermostats which provide for compensation for the dimensional variations of both the thermostat components and assembly tolerances. This method provides a single adjustment for optimizing switch operation and coupling to the thermal motor or disc.

Briefly, in accordance with a first embodiment of the present invention, an assembled disc-type thermostat is placed under a calibration head where the disc snaps under the influence of the elevated temperature. The thermostat cup's disc seat is then formed under the influence of present measuring devices until the thermostat switch contacts open to a predetermined gap. The thermostat has now been rough calibrated. The rough calibrated thermostat is then brought to a disc velocity checking area where the thermostat is cooled down until the disc snaps back, the switch closing disc-velocity-voltage in relation to the peak disc-velocity-voltage being determined. The ratio of desired peak voltage to closing voltage is predetermined and any error is determined and fed back to the calibration station to alter the optimum gap size desired to a different optimum gap size. In a second embodiment a thermostat having normally open contacts, that is contacts which are open at room temperature and closed at an elevated temperature is effected by measuring the contact gap and forming the disc seat until the desired gap is obtained. The calibrated thermostat is placed in the checking station and heated until the disc snaps. Any gap deviation is fed back to the disc seat forming station to correct or improve the desired gap.

Thermostats in which the contacts open at elevated temperatures are calibrated by reversing the disc and measuring the gap, forming the disc seat as required and then taking the disc out and turning it right side up and permanently fixing the cup to the thermostat.

It is therefore an object of this invention to provide a method of on-line calibration of disc-type thermostats.

It is a further object of this invention to provide a thermostat for on-line calibration requiring only one dimensional adjustment.

It is yet a further object of this invention to provide a thermostat which is calibrated on-line by disc seat adjustment.

It is a still further object of this invention to provide a method on-line adjustment of disc-type thermostats with on-line fine tuning of calibration parameter value.

The above objects and still further objects of the invention will become immediately apparent to those skilled in the art after consideration of the following preferred embodiment thereof which is provided by way of example and not by way of limitation wherein.

Figure 1A:
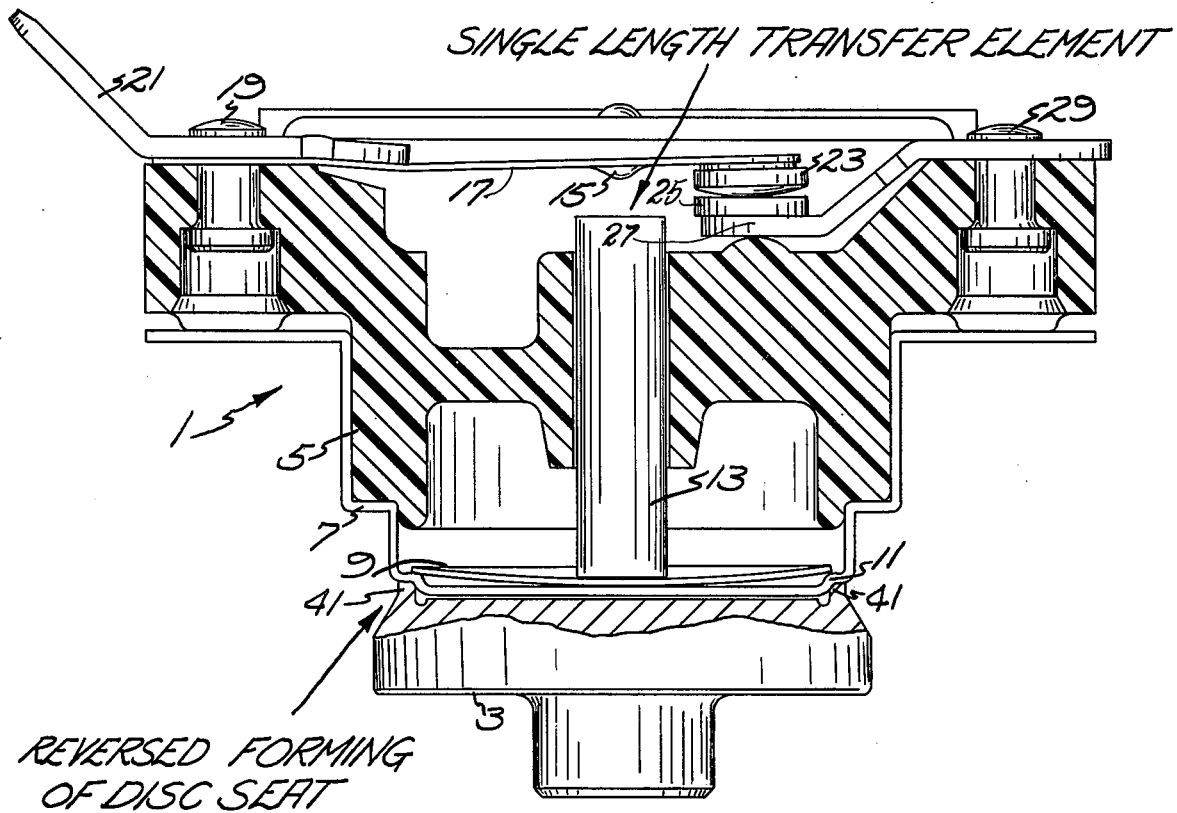
FIG. 1a is a cross-section of a disc-type thermostat with forming tool for disc seat formation.

Referring first to FIG. 1a, there is shown a disc-type thermostat 1 with a forming tool 3 positioned to form the disc seat of the thermostat. The thermostat includes a base 5 with a cup 7 secured thereto. The snap action disc 9 rests on the disc seat portion 11 (better seen in FIG. 1b) of the cup 7 and a pin 13 rests on the disc 9 and is spaced from a protrusion 15 on a contact arm 17. The contact arm 17 is secured to the base 5 by a securing device 19, the terminal 21 being either a part of contact arm 17 or electrically coupled thereto. The contact arm 17 also includes contact 23 which makes contact with a contact 25 on the contact arm 27. The contact arm 27 is secured to the base 5 by a securing means 29. The contact arms 17 and 27 along with their contacts 23 and 25 form a switch. The contact arms 17 and 27 are spring members biased so that the contacts 23 and 25 are normally in intimate contact.

A disc-type thermostat as shown in FIG. 1a operates by having the disc 9 heated to a predetermined minimum temperature, this being a property of the disc whereupon the disc snaps from the downwardly bowed condition as shown in FIG. 1a to an upwardly bowed condition. This disc movement causes the pin 13 to bear against protrusion 15 and move the contact arm 17 upwardly, thereby moving contact 23 away from contact 25. By the use of techniques well known in the art, the optimum gap to be created between the contacts 23 and 25 can be determined a priori. Therefore in the event the gap is too small, the forming tool 3 will be utilized in a manner to be explained in more detail hereinbelow, to form the disc seat 11 by moving said disc seat in a direction toward the switch formed by contact arms 17 and 27 until the disc 9 and pin 13 are positioned whereby snapping of the disc will provide the desired gap between contacts 23 and 25. It can be seen that by using the above described calibration method, only one size of pin need be used with all connection being provided by the single disc seat forming step.

Figure 1B:
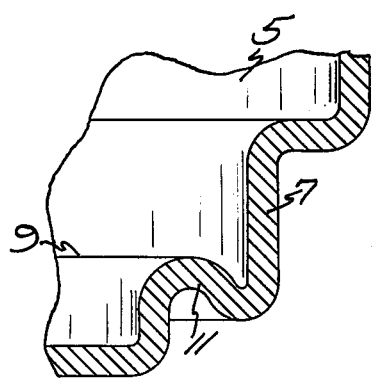
FIG. 1b is an enlarged view of the portion of FIG. 1a in the region of disc seat formation.
Figure 2:
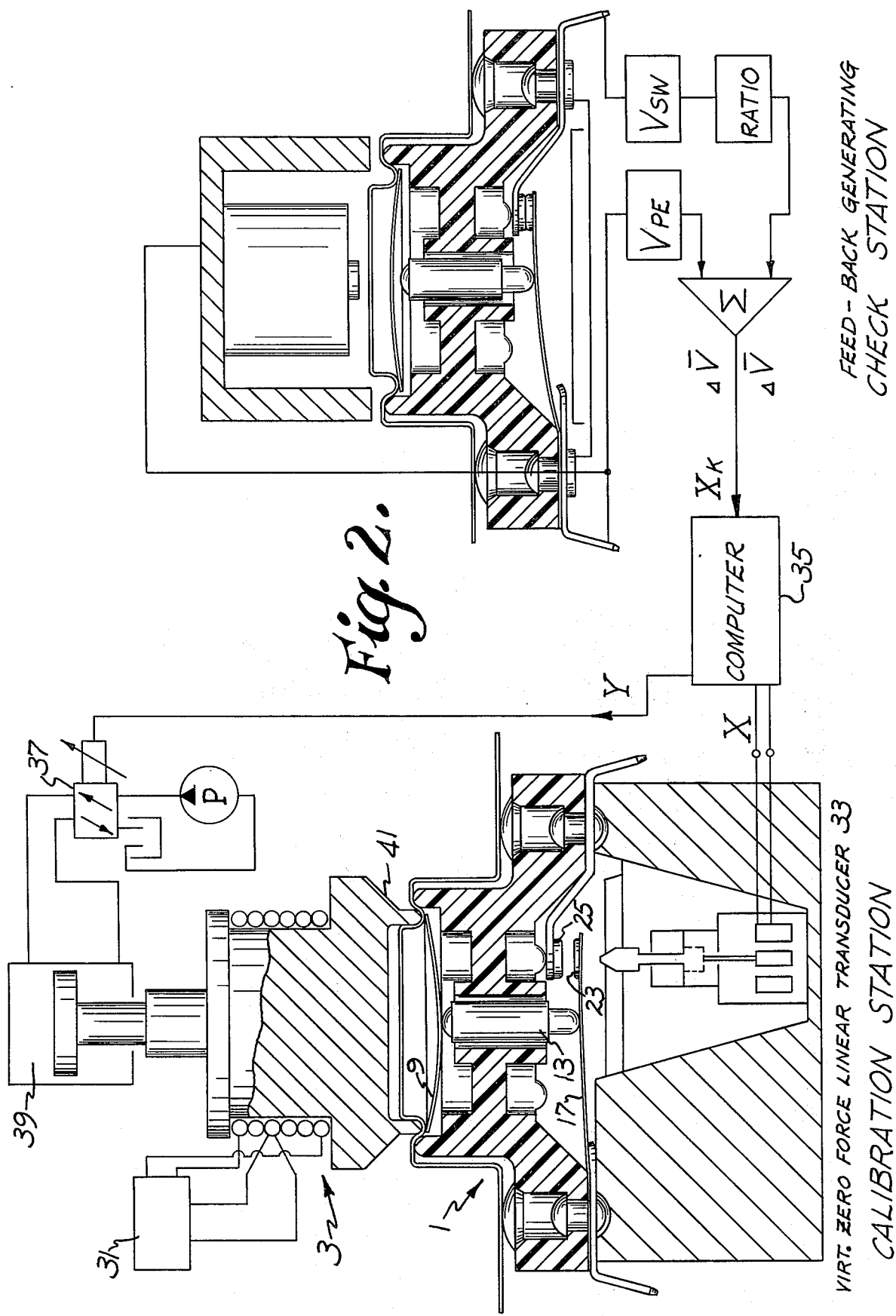
FIG. 2 is a schematic diagram of the calibration system for performing the method of the present invention.

Referring now to FIG. 2, there is shown a schematic diagram of a system for calibrating disc-type thermostats in accordance with the present invention. The assembled thermostat 1 as described with respect to FIG. 1 is placed in a forming tool 3. The temperature is elevated by a temperature control device 31 which heats up the forming tool 3, the heat being transferred to the disc 9 of the thermostat and causing the disc to snap in the manner previously described. Since the thermostat in FIG. 2 is reversed by 180° about a horizontal axis as compared with the thermostat of FIG. 1 the disc in FIG. 2 will snap from an upwardly bowed state to a downwardly bowed state as shown. The disc 9 will force the pin 13 downwardly against the contact arm 17 and provide a gap between the contacts 23 and 25. A measuring device 33 measures the movement of contact arm 17 to measure the gap between contacts 23 and 25. The measuring device can be a dial indicator, a micrometer, an air gauge as produced by Johnson Fluidics, Inc. or any other type of device which can provide an indication of linear movement.

An optimum gap figure is placed into a computer 35, this figure being compared in the computer with the output X of the measuring device 33 to provide an error signal Y which is fed to a hydraulic valve 37 which operates a stepping motor 39. The error computed in the computer 35 determines the magnitude of the signal Y and thereby determines the number of steps required by the stepping motor 39 to provide the proper gap. Stepping of the motor 39 causes the ridges 41 of the forming tool 3 to bear against and deform the cup 7 at the disc seat 11 as best shown in FIGS. 1a and 1b. In this way the assembled thermostat is calibrated by a single operation.

It is of course apparent that the pin 13 will be smaller than required in the unformed state so that there is always the possibility of calibration. It is also apparent that the first calibration as described above is based entirely upon a preset optimum gap which is placed into computer 35 without actual testing. This method, even though accurate for a single thermostat, can have gradual error introduced due to changes in conditions or in the sizes of or changes in the tolerances of the thermostat components. This is corrected on-line by taking the calibrated thermostat from the calibration station to the check station and placing a new thermostat to be calibrated into the calibration station. The thermostat at the check station is now allowed to cool until the disc 9 snaps back to the upwardly bowed state as shown.

Prior to snapping of disc 9, the thermostat at the check station is connected to test apparatus as fully set forth in the copending application of Walter T. Sutton, Jr. filed Dec. 21, 1972, for "Disc Thermostat Test System and Method". The switch closing disc velocity voltage (Vsw) in relation to the peak disc velocity (Vpe) are determined. As set forth in said copending application, the optimum values for switch opening relative to time on the velocity curve are known and by measurement thereof, an error voltage ($\Delta\overline{V}$) is obtained and fed back to the computer 35. This is a fine tuning operation as well as a checking operation and serves to alter the optimum gap stored in the computer on-line. This procedure assumes that component changes will take place gradually. The following device will now be calibrated using the updated optimum gap values. It will be understood that the fine tuning can be done selectively rather than on each thermostat since parameter values normally do not change rapidly but rather change slowly over a period of time.

In a second embodiment calibration is accomplished without heating the disc. This is particularly useful in thermostats which have open contacts at room temperature and closed contacts at elevated temperatures. That is, when the temperature of the disc is elevated to its snapping temperature it snaps away from the switch member. In this embodiment the thermostat is assembled with a transfer pin 13 slightly shorter than required in the first embodiment. The thermostat is then placed in operative relation with forming tool 3, the existing gap between the contacts is measured, the disc seat is then formed until the desired gap is obtained.

The calibrated thermostat is then placed in the checking station and heated until the disc snaps. The gap deviation is fed back to the disc seat forming station to correct or improve the desired gap. The above method of calibrating is based upon the dependence upon the crown height of the disc with temperature. That is, the crown height of a disc changes if the temperature is changed.

Thermostats in which the contacts open at elevated temperatures can be calibrated by reversing the disc since a disc snaps the same distance back and forth about its theoretical flat state. A disc's crown height at a temperature immediately before snapping in heating is identical to the crown height immediately before the disc snaps back in cooling.

In this calibration process a slightly shorter pin than that of the first embodiment is placed in the base, the disc is placed upside down relative to its normal placement, that is the low expansion side is placed toward the switch members, the cup with the disc seat is placed over the assembly but is not fixed. The forming head 3 is lowered (with no heat) over the temporary assembly, the gap between the contacts is measured and the disc seat formed until the desired gap is obtained. The cup is then removed, the disc is turned over and placed back onto the thermostat. The thermostat is then placed under the checking head and the gap and quality of the device measured. The cup is then permanently attached to the base if no further adjustments are required otherwise the thermostat is recycled with the information feed-back to the calibration station.

It can be seen that there has been provided a method and apparatus for on-line calibration of assembled disc-type thermostats with provision for on-line inspection of calibrated thermostats as well as fine tuning of subsequent thermostats to be calibrated to maintain high accuracy on-line production.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

I claim:

1. A method of calibrating an assembled disc-type thermostat comprising the steps of
   a. heating the disc of said thermostat to cause said disc to snap,
   b. measuring the gap between the contacts of the thermostat switch after the disc has snapped,
   c. computing the deviation between desired gap and measured gap,
   d. adjusting the disc seat position in accordance with said computer deviation and
   e. measuring a function of disc velocity and switch operation upon snapping of said disc to provide an error signal and adjusting said desired air gap in step (c) in accordance with said error signal.

2. A method as set forth in claim 1 wherein step (d) comprises operating a stepping motor to step a number of steps determined by said computed deviation and operating a forming tool by stepping of said motor to adjust said disc seat position.

3. A system for on-line calibration of a disc-type thermostat having a pair of contacts, a disc and a cap having a disc seat, which comprises,
   a. forming means for forming a disc seat in said cap, b. heating means adjacent said disc for causing said disc to snap, c. measuring means responsive to snapping of said disc to measure the gap between said contacts, d. means responsive to the output of said measuring means and a predetermined gap value to provide a deviation signal, e. means responsive to said deviation for controlling movement of said forming means, and f. means for measuring a function of operation of said contacts and velocity of said disc to provide an error signal and means responsive to said error signal to alter said predetermined gap value.

4. A system as set forth in claim 3 wherein said heating means includes said forming means.

5. A system as set forth in claim 4 wherein (e) comprises valve means responsive to said measuring means and a stepping motor responsive to said valve means for controlling movement of said forming means.

6. A system as set forth in claim 3 wherein (e) comprises valve means responsive to said measuring means and a stepping motor responsive to said valve means for controlling movement of said forming means.

7. A method of calibrating an assembled disc type thermostat comprising the steps of a. measuring the gap between the contacts of the thermostat switch, b. computing the deviation between desired gap and measured gap, c. adjusting the disc seat position in accordance with said computer deviation, and d. measuring a function of disc velocity and switch operation upon snapping of said disc to provide an error signal and adjusting said desired air gap in step (b) in accordance with said error signal.

8. A method as set forth in claim 7 wherein step (c) comprises operating a stepping motor to step a number of steps determined by said computed deviation and operating a forming tool by stepping of said motor to adjust said disc seat position.

9. A method of calibrating a disc type thermostat switch having contacts which open upon an increase in temperature comprising the steps of a. taking a thermostat base and inserting the disc in the base upside down relative to its disposition during normal use, b. placing a cup with a disc seat over the disc and base, c. measuring the gap between the contacts of the thermostat switch, d. computing the deviation between desired gap and measured gap, e. adjusting the disc seat position in accordance with said computed deviation, f. removing the cup, turning over the disc and replacing it in the thermostat, and g. permanently affixing the cup to the thermostat.

10. A method as set forth in claim 9 further including the steps of again measuring the gap between the thermostat contacts before permanently affixing the cup to the thermostat.

11. A method as set forth in claim 9 wherein step (e) comprises operating a stepping motor to step a number of steps determined by said computed deviation and operating a forming tool by stepping of said motor to adjust said disc seat position.

12. A system for on-line calibration of a disc-type thermostat having a pair of contacts, a disc and a cup having a disc seat, which comprises, a. forming means for forming a disc seat in said cup, b. measuring means to measure the gap between said contacts, c. means responsive to the output of said measuring means and a predetermined gap value to provide a deviation signal, d. means responsive to said deviation for controlling movement of said forming means, and e. means for measuring a function of operation of said contacts and velocity of said disc to provide an error signal and means responsive to said error signal to alter said predetermined gap value.

* * * * *